(12) United States Patent
Tweel et al.

(10) Patent No.: US 12,205,096 B2
(45) Date of Patent: Jan. 21, 2025

(54) EVENT PROCESSING SYSTEM HAVING HAPTIC FEEDBACK

(71) Applicant: Bank of America Corporation, Charlotte, NC (US)

(72) Inventors: Benjamin F. Tweel, Romeoville, IL (US); Neal Aaron Slensker, Fort Mill, SC (US); Chanda Joyner, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 225 days.

(21) Appl. No.: 17/752,217

(22) Filed: May 24, 2022

(65) Prior Publication Data

US 2023/0385795 A1     Nov. 30, 2023

(51) Int. Cl.
*G06Q 20/20*     (2012.01)

(52) U.S. Cl.
CPC .................. *G06Q 20/204* (2013.01)

(58) Field of Classification Search
CPC .............................. G06Q 20/204; G06F 3/016
See application file for complete search history.

(56) References Cited

U.S. PATENT DOCUMENTS

| | | |
|---|---|---|
| 9,317,119 B2 | 4/2016 | Hirose et al. |
| 9,348,416 B2 | 5/2016 | Weddle et al. |
| 10,048,758 B2 | 8/2018 | Modarres et al. |
| 10,180,723 B2 | 1/2019 | Lisseman et al. |
| 11,055,700 B1* | 7/2021 | Goodsitt ............... G06Q 20/357 |
| 2012/0084467 A1* | 4/2012 | Birnbaum ............ G06F 3/04847 710/16 |
| 2015/0082401 A1* | 3/2015 | Gupta ................. H04L 63/0861 726/7 |
| 2018/0150732 A1* | 5/2018 | Suthar ..................... G06K 19/02 |
| 2019/0369734 A1* | 12/2019 | Dillon, Jr. ............... G06F 3/167 |
| 2021/0342820 A1* | 11/2021 | Goodsitt ........... G06Q 20/3224 |
| 2022/0019993 A1* | 1/2022 | Rezayee ............ G06K 19/0712 |
| 2022/0108287 A1* | 4/2022 | Gupta .................. G06Q 20/352 |
| 2022/0180348 A1* | 6/2022 | Montgomery .......... G06F 3/016 |

FOREIGN PATENT DOCUMENTS

EP         2857936 A1     4/2015

* cited by examiner

*Primary Examiner* — Florian M Zeender
*Assistant Examiner* — Vanessa Deligi
(74) *Attorney, Agent, or Firm* — Banner & Witcoff, Ltd.

(57) ABSTRACT

Arrangements for haptic feedback control are provided. In some aspects, registration data may be received from a user. For instance, a user may identify one or more devices (e.g., payment devices such as credit or debit cards, mobile devices, or the like) associated with the user. In some examples, the user may also select customized haptic feedback associated with different feedback outputs. After receiving registration data, the computing platform may receive a request to process a transaction. The transaction may be initiated at a point-of-sale system of an entity via the payment device or card of the user. Transaction details may be analyzed to determine or identify a feedback output (e.g., approved, denied, request additional information or the like). Based on the identified feedback output, a feedback output command or instruction may be generated and transmitted to the payment device for execution.

21 Claims, 11 Drawing Sheets

EVENT PROCESSING SYSTEM HAVING HAPTIC FEEDBACK

BACKGROUND

Aspects of the disclosure relate to electrical computers, systems, and devices for providing haptic feedback via an event processing device.

Payment cards such as debit cards, credit cards, and the like are common forms of payment. However, conventional payment devices include only features or aspects directed to processing a transaction. They do not include functionality to provide feedback to a user. Accordingly, it would be advantageous to provide a payment device providing haptic feedback.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical issues associated with providing haptic feedback via a payment device.

In some aspects, registration data may be received from a user. For instance, a user may identify one or more devices (e.g., payment devices such as credit or debit cards, mobile devices, or the like) associated with the user. In some examples, the user may also select customized haptic feedback associated with different feedback outputs.

After receiving registration data, the computing platform may receive a request to process a transaction. The transaction may be initiated at a point-of-sale system of an entity via the payment device or card of the user. Transaction details may be analyzed to determine or identify a feedback output (e.g., approved, denied, request additional information or the like). Based on the identified feedback output, a feedback output command or instruction may be generated and transmitted to the payment device for execution.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, payment cards, such as debit cards, credit cards, and the like, are common forms of payment that are often used at various point-of-sale systems on a daily basis. However, conventional payment devices are not configured to provide feedback to a user.

Accordingly, aspects discussed herein are directed to receiving a request to process a transaction from, for instance, a point-of-sale system. The transaction may be initiated via a payment device, such as a debit or credit card. Transaction details may be received and analyzed to identify or determine a feedback output. Based on the identified or determined feedback output, a feedback output command may be generated and transmitted to, for instance, the payment device. The feedback output command may be received by the payment device and executed, causing the payment device to deliver haptic feedback corresponding to the identified feedback output.

These and various other arrangements will be discussed more fully below.

Figure 1A:
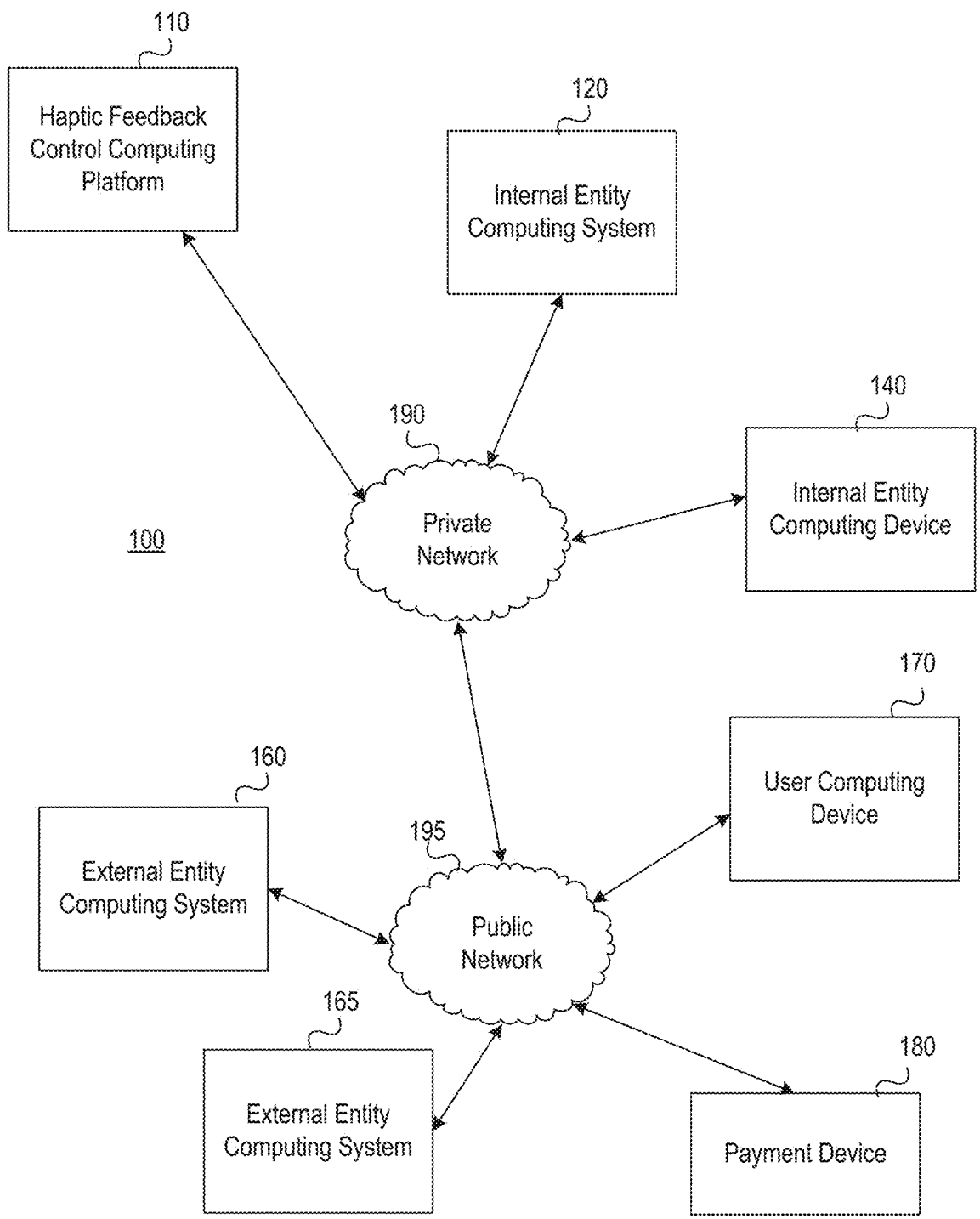
FIGS. 1A and 1B depict an illustrative computing environment for implementing haptic feedback control functions in accordance with one or more aspects described herein.
Figure 1B:
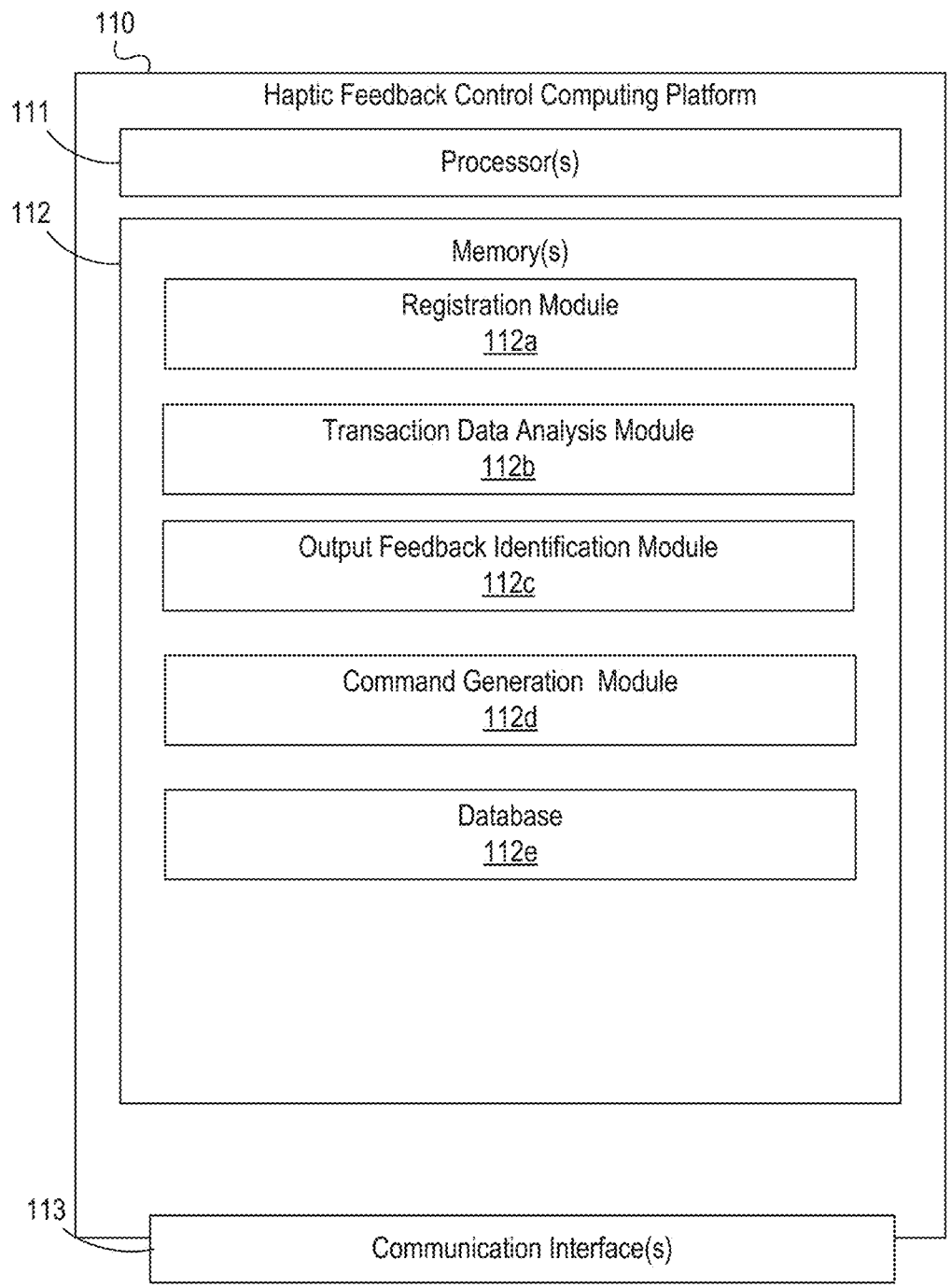

FIGS. 1A-1B depict an illustrative computing environment for implementing haptic feedback control functions in accordance with one or more aspects described herein. Referring to FIG. 1A, computing environment 100 may include one or more computing devices and/or other computing systems. For example, computing environment 100 may include haptic feedback control computing platform 110, internal entity computing system 120, internal entity computing device 140, external entity computing system 160, external entity computing system 165, user computing device 170 and payment device 180. Although one internal entity computing system 120, one internal entity computing device 140, two external entity computing systems 160, 165, one payment device 180 and one user computing device 170 are shown, any number of systems or devices may be used without departing from the invention.

Haptic feedback control computing platform 110 may be configured to perform intelligent, dynamic and efficient evaluation of transaction processing requests and generation of feedback outputs that may be executed by a device, such as a payment device 180, user computing device 170, or the like. For instance, haptic feedback control computing platform 110 may receive a request to process a transaction from for instance, a point-of-sale system (e.g., external entity computing system 160, 165) at a retail location, vendor, or other entity external to the enterprise organization implementing the haptic feedback control computing platform 110. In some examples, the request to process the transaction may be received from user computing device 170. The request may be analyzed to extract transaction details and a feedback output may be identified. For instance, if additional information (e.g., authentication information or the like) is needed before processing the transaction, a first feedback output may be identified. If the transaction is approved and being processed, a second feedback output, different from the first feedback output may be identified.

In some examples, each feedback output may correspond to a different haptic response. For instance, a first feedback output may correspond to two short vibrations, while a second feedback output may correspond to one long vibration (e.g., sustained over a longer period of time than one short vibration). Accordingly, commands causing execution of these haptic responses may be generated and transmitted to one or more device, such as payment device 180, user computing device 170, or the like. The payment device 180 and/or user computing device 170 may execute the received haptic command which may then alert the user to the feedback provided (e.g., additional data is needed, the transaction is being processed, or the like).

Internal entity computing system 120 may be or include one or more computing devices (e.g., servers, server blades, or the like) that may host or execute one or more applications associated with the enterprise organization. For instance, internal entity computing system 120 may host or execute one or more account update applications that may maintain an account ledger and modify a balance of a user account upon processing a transaction. Additionally or alternatively, internal entity computing system 120 may host or execute one or more applications maintaining user data, user account data, user payment device data, and the like.

Internal entity computing device 140 may be or include one or more computing devices, such as laptop computers, desktop computers, smartphones, tablets, or the like, and may be operated by one or more employees of the enterprise organization to modify rules associated with the haptic feedback control computing platform 110.

External entity computing system 160 and external entity computing system 165 may be or include one or more computing devices or systems (e.g., servers, server blades, or the like) that may host or execute one or more applications providing transaction processing services for one or more entities. For instance, external entity computing system 160 and/or external entity computing system 165 may be or include a point-of-sale system at one or more entities or entity locations that may be used to process transactions.

User computing device 170 may be or include a computing device, such as a laptop, desktop, smartphone, smart watch, tablet device, or the like, that may be associated with a user (e.g., customer) requesting the transaction. In some examples, user computing device 170 may be configured to communicate with haptic feedback control computing platform 110 to provide registration data, receive and execute haptic commands, and the like. Accordingly, user computing device 170 may include one or more actuators (e.g., eccentric rotating mass motor, linear resonant actuator, or the like) that may cause vibration upon execution of the haptic command.

Payment device 180 may be or include a credit card, debit card, or the like (e.g., other standard sized or shaped payment card). Payment device 180 may include one or more actuators, power supplies, or the like, that are configured to provide haptic feedback via the payment device 180.

As mentioned above, computing environment 100 also may include one or more networks, which may interconnect one or more of haptic feedback control computing platform 110, internal entity computing system 120, internal entity computing device 140, external entity computing system 160, external entity computing system 165, user computing device 170 and/or payment device 180. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, haptic feedback control computing platform 110, internal entity computing system 120, internal entity computing device 140, may be associated with an enterprise organization (e.g., a financial institution), and private network 190 may be associated with and/or operated by the organization, and may include one or more networks (e.g., LANs, WANs, virtual private networks (VPNs), or the like) that interconnect haptic feedback control computing platform 110, internal entity computing system 120, internal entity computing device 140, and one or more other computing devices and/or computer systems that are used by, operated by, and/or otherwise associated with the organization. Public network 195 may connect private network 190 and/or one or more computing devices connected thereto (e.g., haptic feedback control computing platform 110, internal entity computing system 120, internal entity computing device 140) with one or more networks and/or computing devices that are not associated with the organization. For example, external entity computing system 160, external entity computing system 165, user computing device 170 and/or payment device 180, might not be associated with an organization that operates private network 190 (e.g., because external entity computing system 160, external entity computing system 165, user computing device 170 and/or payment device 180 may be owned, operated, and/or serviced by one or more entities different from the organization that operates private network 190, one or more customers of the organization, one or more employees of the organization, public or government entities, and/or vendors of the organization, rather than being owned and/or operated by the organization itself), and public network 195 may include one or more networks (e.g., the internet) that connect external entity computing system 160, external entity computing system 165, user computing device 170 and/or payment device 180 to private network 190 and/or one or more computing devices connected thereto (e.g., haptic feedback control computing platform 110, internal entity computing system 120, internal entity computing device 140).

Referring to FIG. 1B, haptic feedback control computing platform 110 may include one or more processors 111, memory 112, and communication interface 113. A data bus may interconnect processor(s) 111, memory 112, and communication interface 113. Communication interface 113 may be a network interface configured to support communication between haptic feedback control computing platform 110 and one or more networks (e.g., private network 190, public network 195, or the like). Memory 112 may include one or more program modules having instructions that when executed by processor(s) 111 cause haptic feedback control computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of haptic feedback control computing platform 110 and/or by different computing devices that may form and/or otherwise make up haptic feedback control computing platform 110.

For example, memory 112 may have, store and/or include registration module 112a. Registration module 112a may store instructions and/or data that may cause or enable the haptic feedback control computing platform 110 to receive a registration request for user or user device, such as user computing device 170, payment device 180, or the like, and generate a registration record associated with the enterprise organization. In some examples, registration module 112a may generate a request for additional registration data, such as authentication or validation data, customized haptic feedback, and the like, and may transmit the request to the requesting device. Response data maybe received and stored by the haptic feedback control computing platform 110.

Haptic feedback control computing platform 110 may further have, store and/or include transaction data analysis module 112b. Transaction data analysis module 112b may store instruction and/or data that may cause or enable the haptic feedback control computing platform 110 to receive a request for transaction processing, e.g., from an entity point-of-sale system (external entity computing system 160, external entity computing system 165, or the like) and may extract transaction details to identify an appropriate haptic feedback output. In some examples, analyzing the data may include retrieving enterprise organization data from one or more internal systems, such as internal entity computing system 120.

Haptic feedback control computing platform 110 may further have, store and/or include output feedback identification module 112c. Output feedback identification module 112c may store instructions and/or data that may cause or enable the haptic feedback control computing platform 110 to analyze transaction details received from the transaction processing request and identify one or more haptic outputs to execute. For instance, based on the transaction data analysis, if a transaction is approved, a first type of output may be identified while, if a transaction is denied, a second type of output, different from the first type of output, may be identified. In some examples, each type of output may correspond to a different haptic notification (e.g., a different length of vibration, different combination of vibrations, different number of vibrations, or the like). In some examples, a user may customize feedback output for different scenarios.

Haptic feedback control computing platform 110 may further have, store and/or include command generation module 112d. Command generation module 112d may store instructions and/or data that may cause or enable the haptic feedback control computing platform 110 to generate one or more instructions or commands causing a device (e.g., payment device 180, user computing device 170, or the like) to generate a haptic response. The generated commands may be transmitted to one or more devices and executed to provide haptic feedback to the user.

Haptic feedback control computing platform 110 may further have, store and/or include a database 112e. Database 112e may store registration data, customization data, and the like, that may be used to identify outputs and generate haptic feedback commands.

FIGS. 2A-2G depict one example illustrative event sequence for implementing haptic feedback control functions in accordance with one or more aspects described herein. The events shown in the illustrative event sequence are merely one example sequence and additional events may be added, or events may be omitted, without departing from the invention. Further, one or more processes discussed with respect to FIGS. 2A-2G may be performed in real-time or near real-time.

Figure 2A:
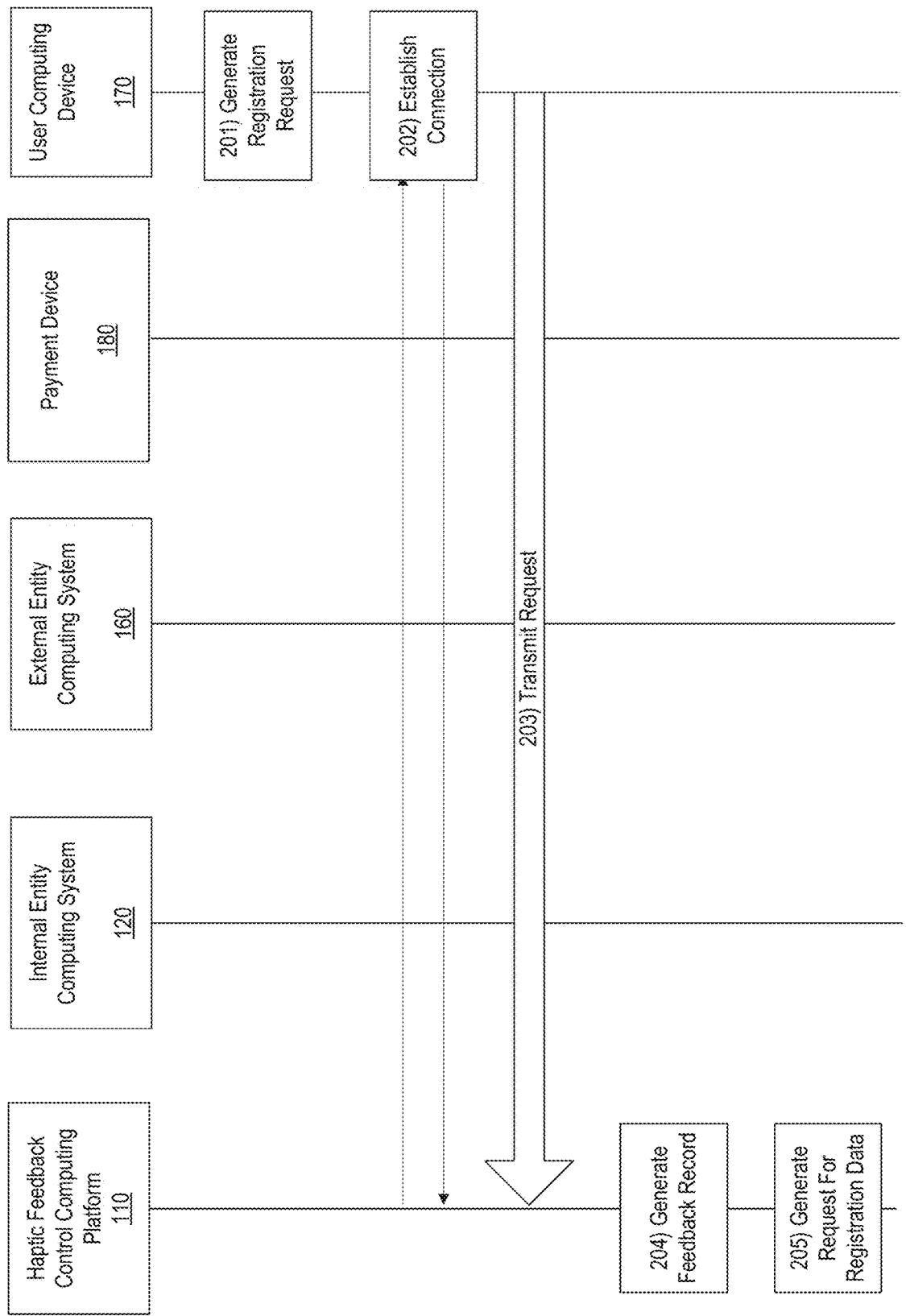
FIGS. 2A-2G depict an illustrative event sequence for implementing haptic feedback control functions in accordance with one or more aspects described herein.

With reference to FIG. 2A, at step 201, a registration request may be generated by a user computing device 170. For instance, a user may input, via one or more input devices, to the user computing device 170, a request to register with the enterprise organization and the haptic feedback control computing platform 110. Accordingly, a registration request may be generated based on the user input received.

At step 202, a connection may be established between user computing device 170 and haptic feedback control computing platform 110. For instance, a first wireless connection may be established between the user computing device 170 and the haptic feedback control computing platform 110. Upon establishing the first wireless connection, a communication session may be initiated between haptic feedback control computing platform 110 and user computing device 170.

At step 203, user computing device 170 may transmit the registration request to the haptic feedback control computing platform 110. For instance, the registration request may be transmitted during the communication session initiated upon establishing the first wireless connection.

At step 204, the registration request may be received by the haptic feedback control computing platform 110 may a feedback record may be generated. For instance, one or more databases may be modified to include a record associated with the user computing device 170 from which the request was received.

At step 205, haptic feedback control computing platform 110 may generate a request for registration data. For instance, data associated with devices of the user (e.g., identifiers associated with the user computing device 170 or other user computing devices, identifiers associated with the payment device 180 of the user, and the like), validation/authentication data, feedback customization preferences, and the like, may be requested.

Figure 2B:
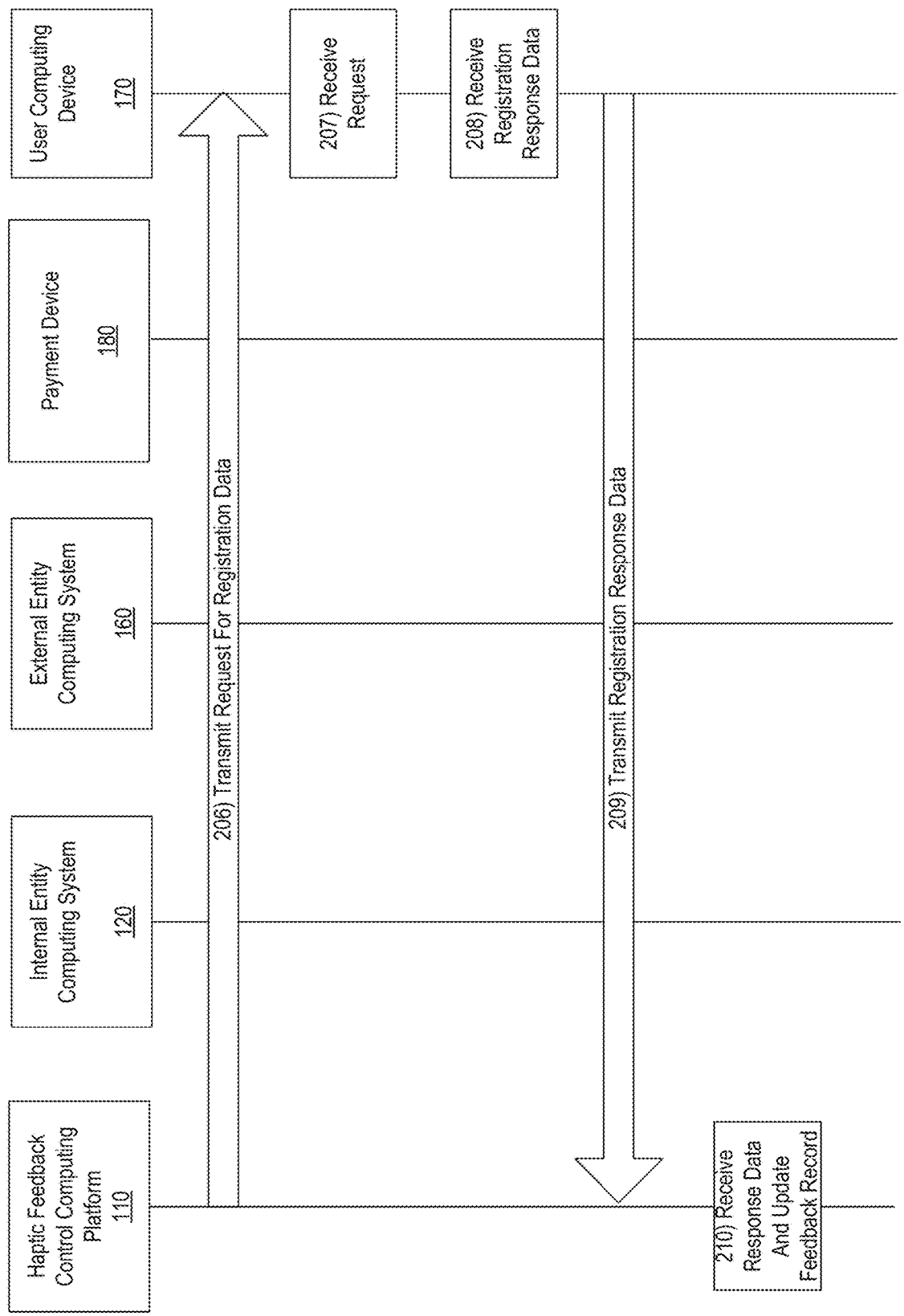

With reference to FIG. 2B, at step 206, the haptic feedback control computing platform 110 may transmit the request for registration data to the user computing device 170. In some examples, the request may be transmitted during the communication session initiated upon establishing the first wireless connection.

At step 207, the user computing device 170 may receive the request for registration data.

At step 208, registration response data may be received by the user computing device 170. For instance, response data including data responsive to the requests (e.g., for device identifiers, customization options, and the like) may be received (e.g., via user input, via data extraction, or the like) and registration response data may be generated.

At step 209, the registration response data may be transmitted by the user computing device 170 to the haptic feedback control computing platform 110. For instance, the response data may be transmitted during the communication session initiated upon establishing the first wireless connection or a new connection and communication session may be established and initiated.

At step 210, the registration response data may be received and stored. For instance, the feedback record associated with the user or user computing device 170 may be updated to include the received registration response data. In some examples, the registration response data may include identifiers of particular devices associated with the user, customization options, authentication data, and the like.

Figure 2C:
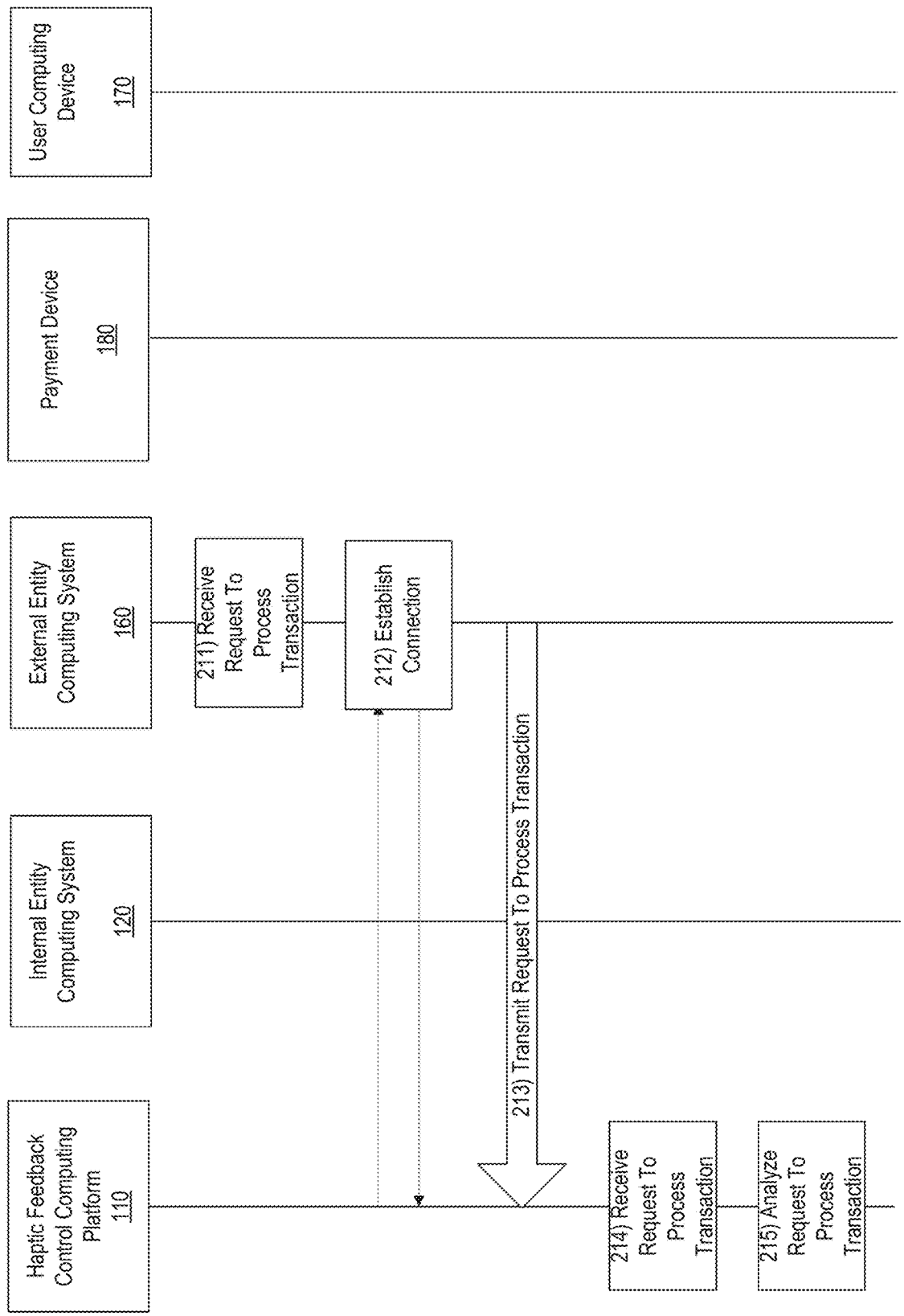

With reference to FIG. 2C, at step 211, a request to process a transaction may be received by an external entity computing system 160. For instance, a point-of-sale system at a retail location may receive a request to process a transaction (e.g., a request for purchase, return, or the like)

made via a user requesting the transaction via a payment device 180, user computing device 170, or the like.

At step 212, a connection may be established between external entity computing system 160 and haptic feedback control computing platform 110. For instance, a second wireless connection may be established between the external entity computing system 160 and the haptic feedback control computing platform 110. Upon establishing the second wireless connection, a communication session may be initiated between haptic feedback control computing platform 110 and external entity computing system 160.

At step 213, the external entity computing system 160 may transmit the request to process the transaction to the haptic feedback control computing platform 110. For instance, the request to process the transaction may be transmitted during the communication session initiated upon establishing the second wireless connection.

At step 214, the haptic feedback control computing platform 110 may receive the request to process the transaction.

At step 215, the haptic feedback control computing platform 110 may analyze the request to process the transaction. In some examples, analyzing the request to process the transaction may include requesting data from one or more internal systems, such as internal entity computing system 120.

Figure 2D:
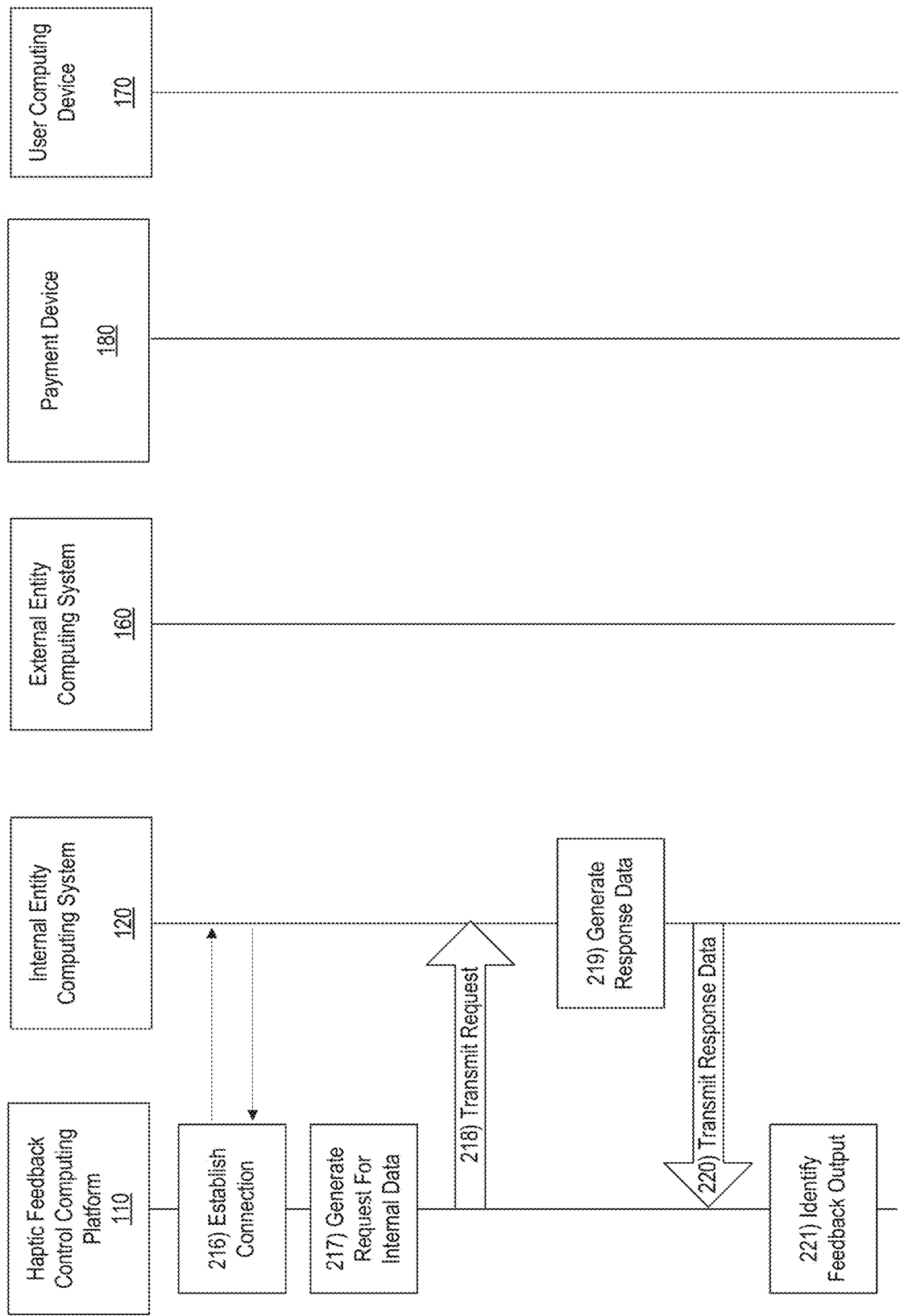

Accordingly, with reference to FIG. 2D, at step 216, a connection may be established between internal entity computing system 120 and haptic feedback control computing platform 110. For instance, a third wireless connection may be established between the internal entity computing system 120 and the haptic feedback control computing platform 110. Upon establishing the third wireless connection, a communication session may be initiated between haptic feedback control computing platform 110 and internal entity computing system 120.

At step 217, a request for internal data may be generated by the haptic feedback control computing platform 110. For instance, a request for internal data including a current status of a user account, user account details or the like, may be generated.

At step 218, the haptic feedback control computing platform 110 may transmit the requests for data to the internal entity computing system 120. For instance, the request for data may be transmitted during the communication session initiated upon establishing the third wireless connection.

At step 219, the request for data may be received by internal entity computing system 120 and response data may be generated. For instance, user or account data may be retrieved and used to generate response data. At step 220, the response data may be transmitted to the haptic feedback control computing platform 110.

In some examples, internal data might not be requested and steps 216 through 220 may be optional.

At step 221, haptic feedback control computing platform 110 may identify feedback output. For instance, based on the analysis of the transaction data, and internal data received, a feedback output may be identified. In some examples, the feedback output may be identified based on one or more customization options provided by the user. For instance, for approval of a requested transaction, a user may request a first feedback output and may request a second, different feedback output if more information is needed. In some examples, identifying the feedback output may also include identifying a device associated with the user to which the output may be transmitted.

Figure 2E:
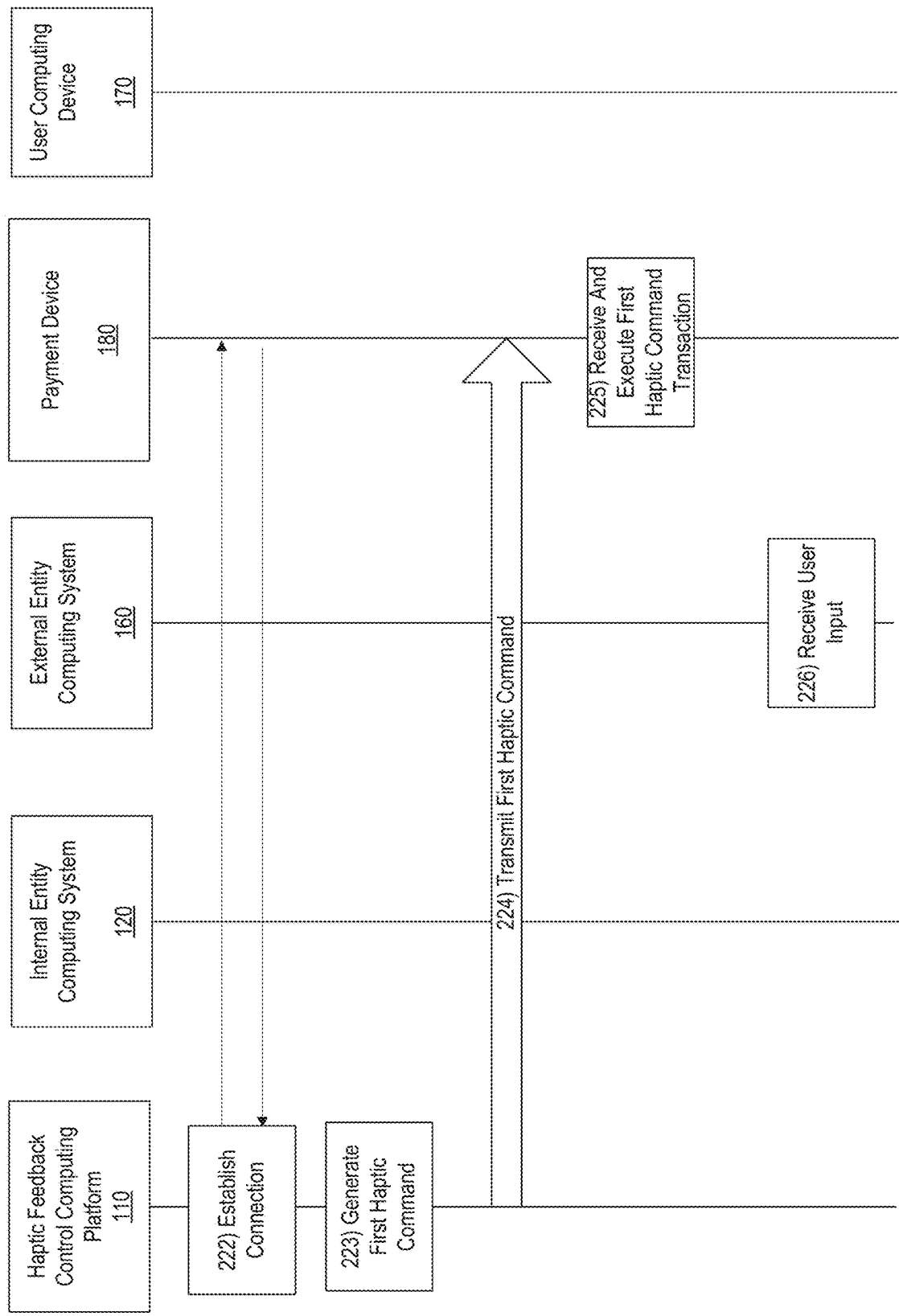

With reference to FIG. 2E, at step 222, a connection may be established between haptic feedback control computing platform 110 and payment device 180. For instance, a fourth wireless connection may be established between the haptic feedback control computing platform 110 and payment device 180. Upon establishing the fourth wireless connection, a communication session may be initiated between haptic feedback control computing platform 110 and payment device 180.

At step 223, a first haptic command or instruction may be generated. For instance, a first haptic command or instruction based on the identified feedback output may be generated. The first haptic command may include a signal or instruction causing the receiving device to execute the first haptic command.

At step 224, the first haptic command may be transmitted by the haptic feedback control computing platform 110 to the payment device 180. For instance, the first haptic command may be transmitted during the communication session initiated upon establishing the fourth wireless connection.

At step 225, payment device 180 may receive the first haptic command and execute the first haptic command. Executing the first haptic command may cause the payment device (e.g., via one or more actuators associated with the payment device) to vibrate in a particular pattern or execute a number of vibrations associated with the first haptic command.

In some examples, the first haptic command may indicate that additional information, approval, or the like is required for the requested transaction. Accordingly, at step 226, the user may provide additional input via the point-of-sale system (e.g., external entity computing system 160). In some arrangements, this step may be optional (e.g., additional information might not be requested). Further, in some examples, the user input may be provided via the payment device, user computing device 170, or the like, without departing from the invention.

Figure 2F:
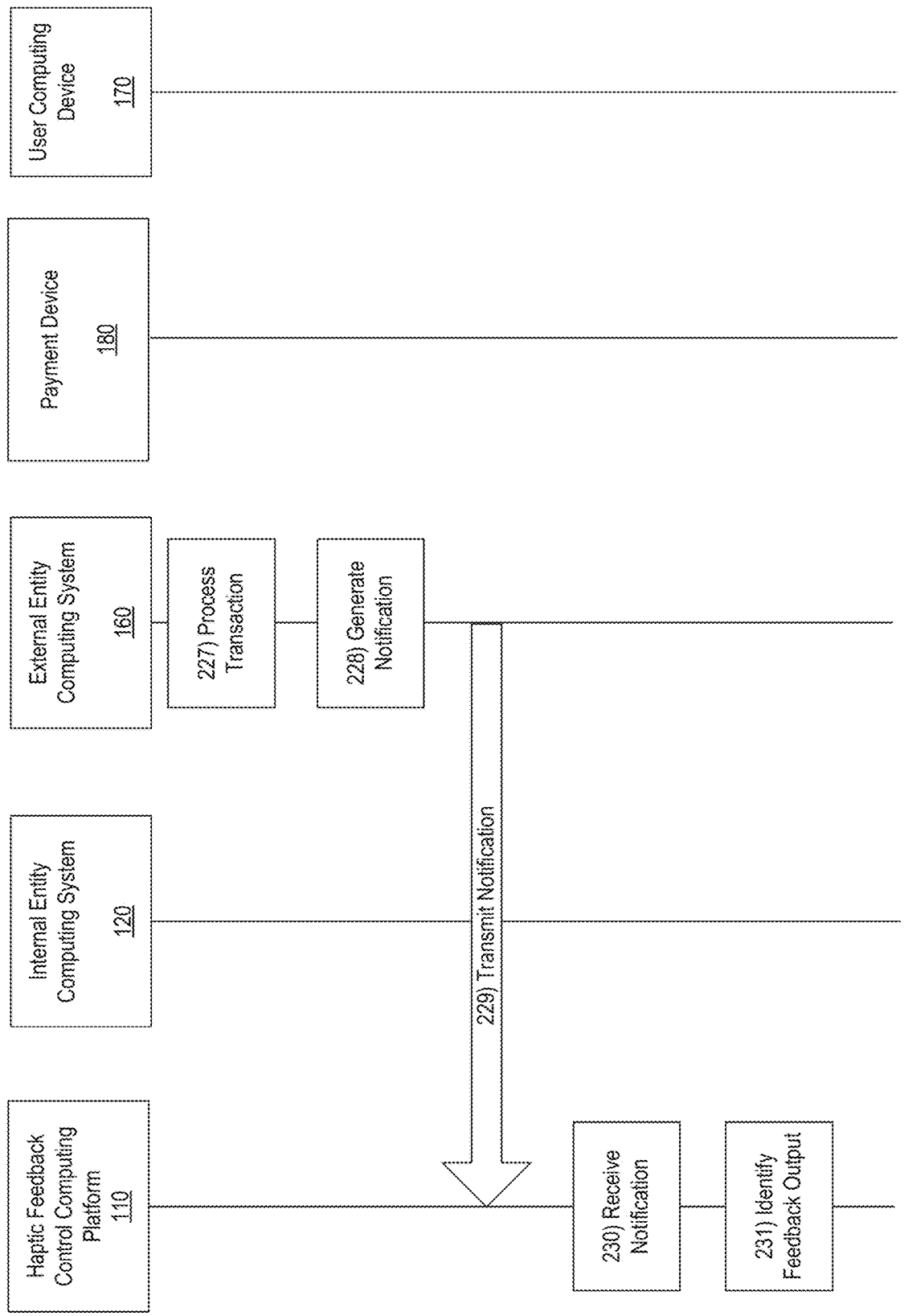

With reference to FIG. 2F, at step 227, external entity computing system 160 may process the transaction. For instance, if additional information was required and received, the transaction may be processed. If additional information was not required, the transaction may proceed to processing.

At step 228, a notification indicating that the transaction was processed may be generated by the external entity computing system 160. At step 229, the notification may be transmitted to the haptic feedback control computing platform 110. In some examples, the notification may be transmitted during a communication session initiated upon establishing a wireless connection. Alternatively, if no connection is established, a wireless connection may be established and communication session initiated.

At step 230, the haptic feedback control computing platform 110 may receive the generated notification.

At step 231, based on received notification, a follow-up feedback output may be identified. For instance, if the notification indicates that the transaction was successfully processed, a feedback output associated with successful processing may be identified.

Figure 2G:
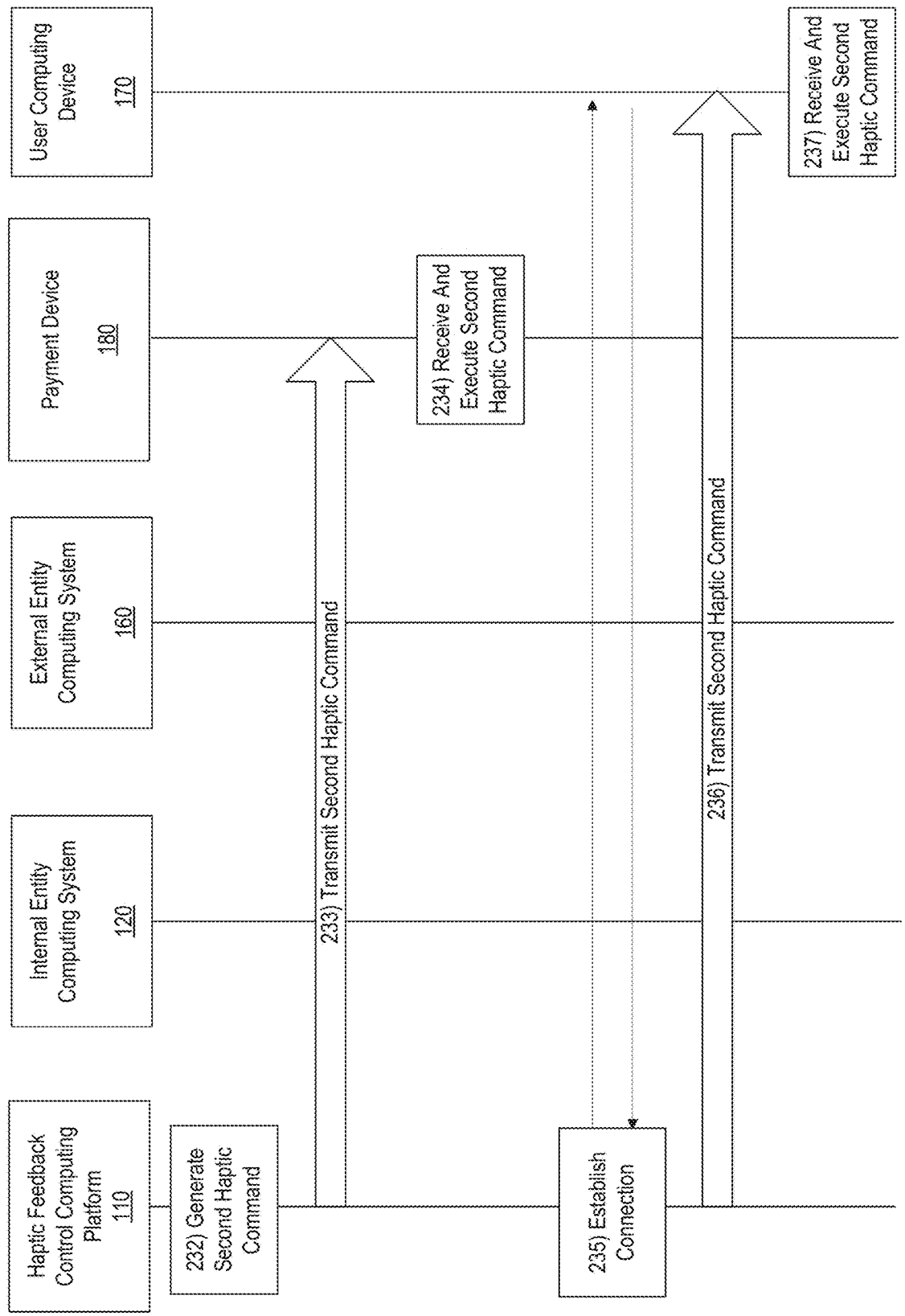

With reference to FIG. 2G, at step 232, a second haptic feedback command may be generated by the haptic feedback control computing platform 110. For instance, based on the identified follow-up feedback output, a second haptic feedback command or instruction may be generated and may include a signal causing a receiving device to execute the command or instruction and initiate the designated haptic feedback.

At step 233, the haptic feedback control computing platform 110 may transmit the second haptic feedback command to a device, such as payment device 180. At step 234, the second haptic feedback command may be received by the payment device and executed causing the identified pattern or number of vibrations to occur at the payment device (e.g., causing one or more actuators at the payment device 180 to vibrate).

In some examples, the second haptic feedback command may be transmitted to an additional device (e.g., a mobile device of a user). Accordingly, at step 235, a connection may be established between haptic feedback control computing platform 110 and user computing device 170. For instance, a fifth wireless connection may be established between the haptic feedback control computing platform 110 and user computing device 170. Upon establishing the fifth wireless connection, a communication session may be initiated between haptic feedback control computing platform 110 and user computing device 170. If a connection is already established, step 235 may be omitted.

At step 236, the haptic feedback control computing platform 110 may transmit the second haptic command to the user computing device 170. At step 237, the user computing device 170 may receive and execute the second haptic command causing the user computing device to provide the haptic feedback to the user.

Figure 3:
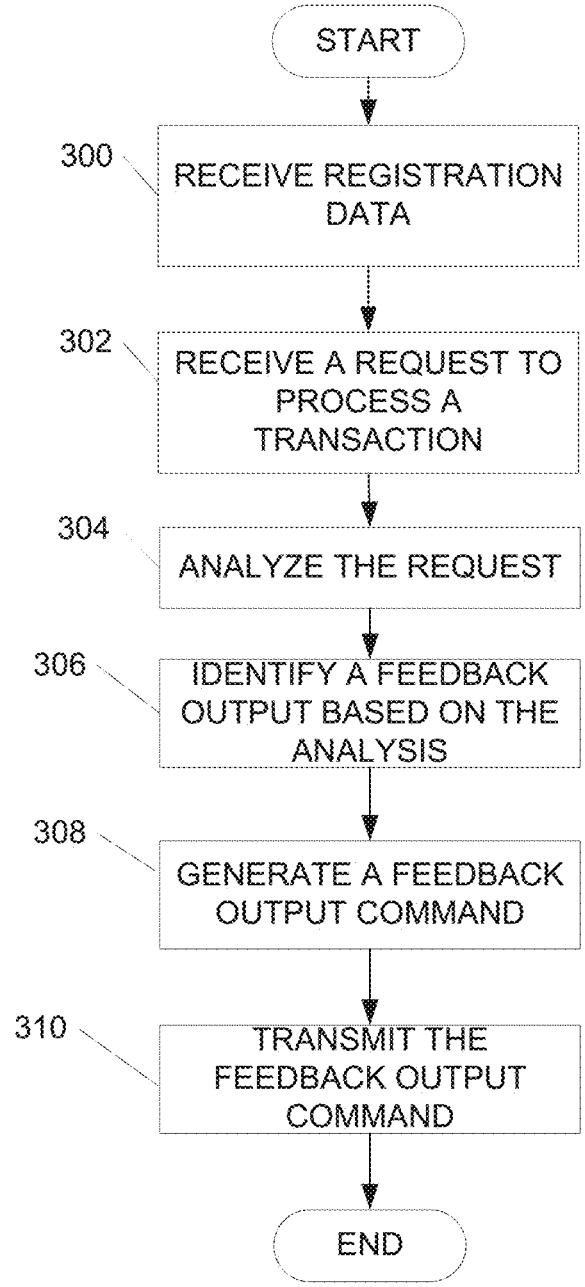
FIG. 3 illustrates an illustrative method for implementing haptic feedback control functions according to one or more aspects described herein.

FIG. 3 is a flow chart illustrating one example method of implementing haptic feedback control functions in accordance with one or more aspects described herein. The processes illustrated in FIG. 3 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 3 may be performed in real-time or near real-time.

At step 300, registration data may be received. For instance, a user may request registration with an enterprise organization or haptic feedback control computing platform 110 via, for instance, a user computing device, such as a mobile device. In some examples, the registration data may include identification of the user, identification of one or more devices associated with the user (e.g., payment devices, mobile devices, or the like), identification of one or more accounts of the user, customization options associated with types of haptic feedback to provide as different outputs, and the like. In some examples, customization options might not be used to selected and default haptic feedback patterns may be designated to correspond to various feedback outputs.

At step 302, a request to process a transaction may be received from, for instance, a point-of-sale system at an entity location. The request to process the transaction may include transaction details or data such as type of transaction, amount of transaction, user account or payment device being used, and the like.

At step 304, the request to process the transaction may be analyzed. For instance, transaction data may be analyzed to determine whether additional information (e.g., authentication information, approval data, or the like) is required, whether the requested transaction is approved or denied, and the like. In some examples, analyzing the request to process the transaction may include retrieving user data from one or more systems, such as internal entity computing system 120. For instance, data such as account balance, transaction limits, and the like, may be retrieved and analyzed with the transaction details. In some examples, a decision to approve or deny the transaction may be made via the analysis and based on the transaction details or data.

At step 306, based on the analysis of the request and, in some examples, the retrieved data, a feedback output may be identified. For instance, a feedback output including haptic feedback in one or more patterns or number of vibrations may be identified. In some examples, the identified or determined feedback output may be based on customizations provided by the user associated with the payment device. For instance, a user may customize different patterns of vibration, number of vibrations, or the like, to receive based on the analysis (e.g., a first feedback output may correspond to approval of the transaction while a second, different feedback output may correspond to denial of the transaction). In some examples, the identified or determined feedback output may be selected from a plurality of feedback outputs (e.g., pre-defined feedback outputs identified during a registration process or default pre-defined feedback outputs) each corresponding to a different haptic response (e.g., different pattern of vibrations, different number of vibrations, or the like).

At step 308, a feedback output command or instruction may be generated. For instance, a feedback output command or instruction including a signal that, when executed by a receiving device, may cause the receiving device to vibrate according to the identified or determined feedback output may be generated.

At step 310, the generated feedback output command may be transmitted to a receiving device, such as a payment device used to initiate the transaction, a user computing device, or the like. Transmitting the feedback output command may cause the receiving device to execute the command and initiate a haptic response (e.g., causing the receiving device to vibrate) corresponding to the identified or determined feedback output.

Aspects described herein are related to providing haptic feedback to a payment card or device, such as a debit card, credit card, or the like. In some examples, the payment card or device may include one or more actuators configured to provide haptic feedback, a power supply, and the like. When a user requests processing of a transaction, e.g., via a point-of-sale system at a vendor, retail location, or the like, feedback may be provided to the user via a haptic response from the payment card or device. Accordingly, users having different sensory abilities may be informed of feedback with respect to the requested transaction by a pattern of vibration, number of vibrations, length of vibration, or the like, provided via the payment card or device.

As discussed herein, haptic feedback may be used to indicate different feedback regarding processing of the transaction. For instance, each feedback output (e.g., transaction approved, transaction declined, request for personal identification number, request for authentication data, or the like) may correspond to a different pattern of haptic feedback (e.g., one long vibration for approved, two short vibrations for declined, one long, one sort and one long vibration for request data, or the like). The appropriate feedback output may be identified or determined based on the transaction details (e.g., amount, type, and the like), whether the transaction is approved, and the like.

In at least some examples, the patterns of vibration corresponding to each feedback output may be customized by the user. For instance, during the registration process, the user may select one or more customization options to choose haptic patterns, or the like, for each feedback output. Accordingly, the user may be familiar with each pattern received and may understand, based on the pattern or number of vibrations, length of vibration, or the like, what the feedback means. This feature may be particularly useful for users having limited visual acuity, limited audio acuity, fine motor skill issues, or the like.

As discussed herein, the payment device or card may include one or more actuators configured to provide the haptic feedback (e.g., embedded in the card). The one or more actuators may be arranged in a small unit including a power supply, such as a rechargeable battery, that may be embedded in the payment card or device.

In some examples, biometric authentication sensors may also be included in the payment device or card. For instance, a fingerprint or other biometric sensor may be included on a surface of the card and used to authenticate a user requesting a transaction. Additionally or alternatively, a user may provide biometric authentication data via one or more sensors on a user computing device that may then authenticate the user, authorize a transaction via the linked payment device or card, or the like.

As discussed herein, in some examples, (e.g., in situations in which a card is not configured to provide haptic feedback) feedback may be provided via the user computing device. Accordingly, upon requesting a transaction via the payment card or device, a feedback output may be identified and a command transmitted to the user computing device that may cause the user computing device to provide the haptic feedback to the user.

Figure 4:
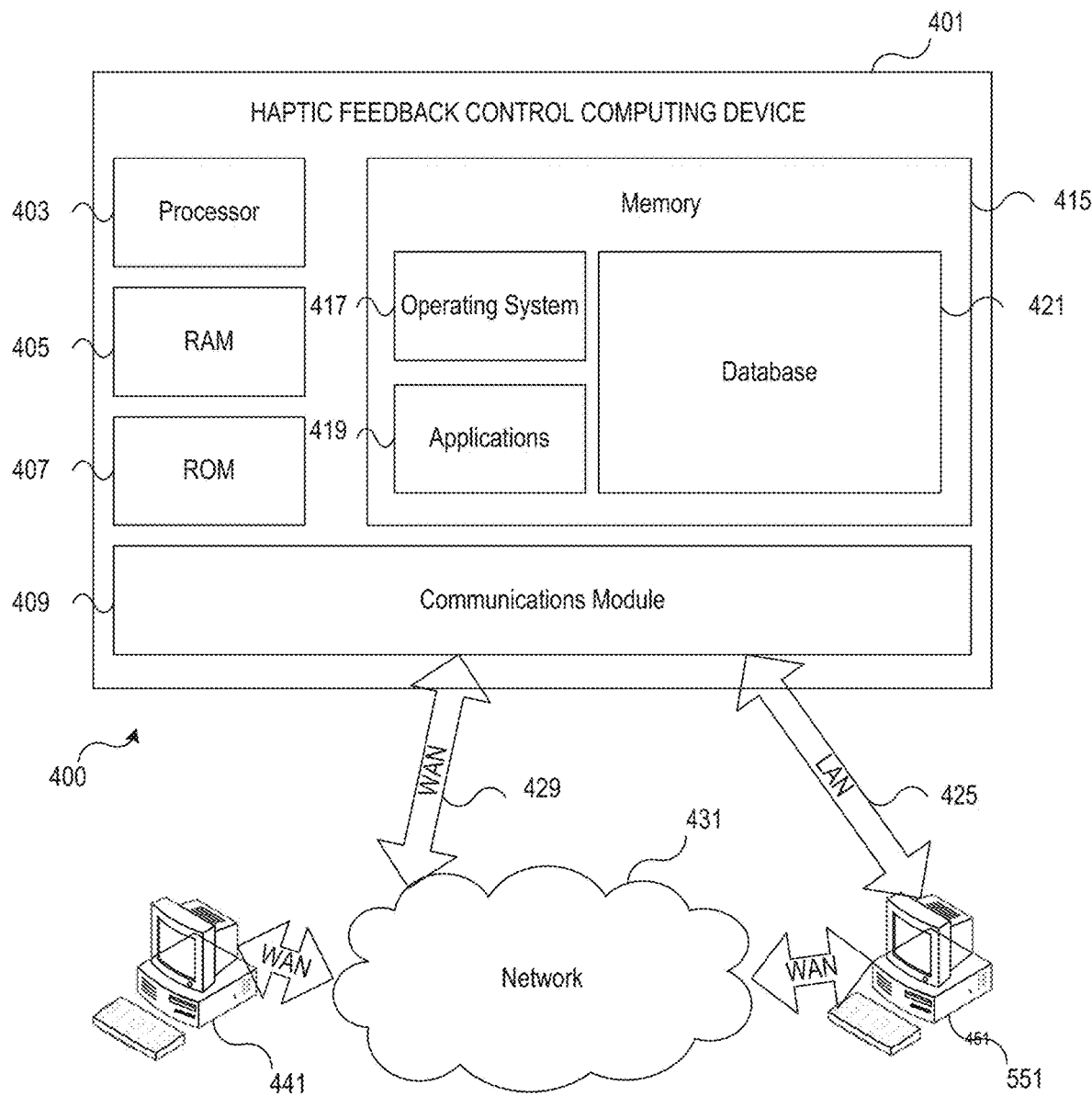
FIG. 4 illustrates one example environment in which various aspects of the disclosure may be implemented in accordance with one or more aspects described herein.

FIG. 4 depicts an illustrative operating environment in which various aspects of the present disclosure may be implemented in accordance with one or more example embodiments. Referring to FIG. 4, computing system environment 400 may be used according to one or more illustrative embodiments. Computing system environment 400 is only one example of a suitable computing environment and is not intended to suggest any limitation as to the scope of use or functionality contained in the disclosure. Computing system environment 400 should not be interpreted as having any dependency or requirement relating to any one or combination of components shown in illustrative computing system environment 400.

Computing system environment 400 may include haptic feedback control computing device 401 having processor 403 for controlling overall operation of haptic feedback control computing device 401 and its associated components, including Random Access Memory (RAM) 405, Read-Only Memory (ROM) 407, communications module 409, and memory 415. Haptic feedback control computing device 401 may include a variety of computer readable media. Computer readable media may be any available media that may be accessed by haptic feedback control computing device 401, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by haptic feedback control computing device 401.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on haptic feedback control computing device 401. Such a processor may execute computer-executable instructions stored on a computer-readable medium.

Software may be stored within memory 415 and/or storage to provide instructions to processor 403 for enabling haptic feedback control computing device 401 to perform various functions as discussed herein. For example, memory 415 may store software used by haptic feedback control computing device 401, such as operating system 417, application programs 419, and associated database 421. Also, some or all of the computer executable instructions for haptic feedback control computing device 401 may be embodied in hardware or firmware. Although not shown, RAM 405 may include one or more applications representing the application data stored in RAM 405 while haptic feedback control computing device 401 is on and corresponding software applications (e.g., software tasks) are running on haptic feedback control computing device 401.

Communications module 409 may include a microphone, keypad, touch screen, and/or stylus through which a user of haptic feedback control computing device 401 may provide input, and may also include one or more of a speaker for providing audio output and a video display device for providing textual, audiovisual and/or graphical output. Computing system environment 400 may also include optical scanners (not shown).

Haptic feedback control computing device 401 may operate in a networked environment supporting connections to one or more remote computing devices, such as computing devices 441 and 451. Computing devices 441 and 451 may be personal computing devices or servers that include any or all of the elements described above relative to haptic feedback control computing device 401.

The network connections depicted in FIG. 4 may include Local Area Network (LAN) 425 and Wide Area Network (WAN) 429, as well as other networks. When used in a LAN networking environment, haptic feedback control computing device 401 may be connected to LAN 425 through a network interface or adapter in communications module 409. When used in a WAN networking environment, haptic feedback control computing device 401 may include a modem in communications module 409 or other means for establishing communications over WAN 429, such as network 431 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
at least one processor;
a communication interface communicatively coupled to the at least one processor; and
a memory storing computer-readable instructions that, when executed by the at least one processor, cause the computing platform to:
receive, from a point-of-sale system, a request to process a transaction, the request to process the transaction initiated using a payment card having a power supply and actuator configured to cause vibration of the payment card, and the request to process the transaction including transaction data;
responsive to receiving the request to process the transaction, analyze the transaction data to determine a first feedback output, wherein the first feedback output corresponds to a request for additional information;
generate a first feedback output command based on the determined first feedback output;
transmit, to the payment card, the first feedback output command, wherein transmitting the first feedback output command causes the payment card to execute a first haptic response including causing, by the actuator of the payment card, vibration of the payment card for a first length of time;
receive, responsive to the first haptic response executed by the payment card, and via the point-of-sale system, the additional information;
analyze the additional information to determine a second feedback output, wherein the second feedback output corresponds to approval or rejection of the transaction;
generate a second feedback output command based on the determined second feedback output; and
transmit, to the payment card, the second feedback output command, wherein transmitting the second feedback output command causes the payment card to execute a second haptic response including causing, by the actuator of the payment card, vibration of the payment card for a second length of time different from the first length of time.

2. The computing platform of claim 1, wherein the determined first feedback output is a feedback output selected from a plurality of pre-defined feedback outputs.

3. The computing platform of claim 2, wherein each pre-defined feedback output corresponds to a corresponding haptic response.

4. The computing platform of claim 1, further including instructions that, when executed, cause the computing platform to:

receive, from a user computing device, registration data, the registration data including identification of the payment card and customized feedback outputs selected by a user associated with the user computing device and the payment card.

5. The computing platform of claim 1, wherein the first haptic response further includes one of: a pattern or number of vibrations corresponding to the determined first feedback output.

6. The computing platform of claim 1, wherein analyzing the transaction data includes retrieving user data associated with a user of the payment card.

7. The computing platform of claim 1, further including instructions that, when executed, cause the computing platform to:
transmit, to a user computing device different from the payment card, the second feedback output command, wherein transmitting the second feedback output command causes the user computing device to execute the second haptic response including vibration of the user computing device.

8. A method, comprising:
receiving, by a computing platform, the computing platform having at least one processor and memory, and from a point-of-sale system, a request to process a transaction, the request to process the transaction initiated using a payment card having a power supply and actuator configured to cause vibration of the payment card, and the request to process the transaction including transaction data;
responsive to receiving the request to process the transaction, analyzing, by the at least one processor, the transaction data to determine a first feedback output, wherein the first feedback output corresponds to a request for additional information;
generating, by the at least one processor, a first feedback output command based on the determined first feedback output;
transmitting, by the at least one processor and to the payment card, the first feedback output command, wherein transmitting the first feedback output command causes the payment card to execute a first haptic response including causing, by the actuator of the payment card, vibration of the payment card for a first length of time;
receiving, by the at least one processor and responsive to the first haptic response executed by the payment card, and via the point-of-sale system, the additional information;
analyzing, by the at least one processor, the additional information to determine a second feedback output, wherein the second feedback output corresponds to approval or rejection of the transaction;
generating, by the at least one processor, a second feedback output command based on the determined second feedback output; and
transmitting, by the at least one processor and to the payment card, the second feedback output command, wherein transmitting the second feedback output command causes the payment card to execute a second haptic response including causing, by the actuator of the payment card, vibration of the payment card for a second length of time different from the first length of time.

9. The method of claim 8, wherein the determined first feedback output is a feedback output selected from a plurality of pre-defined feedback outputs.

10. The method of claim 9, wherein each pre-defined feedback output corresponds to a corresponding haptic response.

11. The method of claim 8, further including:
receiving, by the at least one processor and from a user computing device, registration data, the registration data including identification of the payment card and customized feedback outputs selected by a user associated with the user computing device and the payment card.

12. The method of claim 8, wherein the first haptic response further includes one of: a pattern or number of vibrations corresponding to the determined first feedback output.

13. The method of claim 8, wherein analyzing the transaction data includes retrieving user data associated with a user of the payment card.

14. The method of claim 8, further including:
transmitting, by the at least one processor and to a user computing device different from the payment card, the second feedback output command, wherein transmitting the second feedback output command causes the user computing device to execute the second haptic response including vibration of the user computing device.

15. One or more non-transitory computer-readable media storing instructions that, when executed by a computing platform comprising at least one processor, memory, and a communication interface, cause the computing platform to:
receive, from a point-of-sale system, a request to process a transaction, the request to process the transaction initiated using a payment card having a power supply and actuator configured to cause vibration of the payment card, and the request to process the transaction including transaction data;
responsive to receiving the request to process the transaction, analyze the transaction data to determine a first feedback output, wherein the first feedback output corresponds to a request for additional information;
generate a first feedback output command based on the determined first feedback output; and
transmit, to the payment card, the first feedback output command, wherein transmitting the first feedback output command causes the payment card to execute a first haptic response including causing, by the actuator of the payment card, vibration of the payment card for a first length of time;
receive, responsive to the first haptic response executed by the payment card, and via the point-of-sale system, the additional information;
analyze the additional information to determine a second feedback output, wherein the second feedback output corresponds to approval or rejection of the transaction;
generate a second feedback output command based on the determined second feedback output; and
transmit, to the payment card, the second feedback output command, wherein transmitting the second feedback output command causes the payment card to execute a second haptic response including causing, by the actuator of the payment card, vibration of the payment card for a second length of time different from the first length of time.

16. The one or more non-transitory computer-readable media of claim 15, wherein the determined first feedback output is a feedback output selected from a plurality of pre-defined feedback outputs.

17. The one or more non-transitory computer-readable media of claim 16, wherein each pre-defined feedback output corresponds to a corresponding haptic response.

18. The one or more non-transitory computer-readable media of claim 15, further including instructions that, when executed, cause the computing platform to:
receive, from a user computing device, registration data, the registration data including identification of the payment card and customized feedback outputs selected by a user associated with the user computing device and the payment card.

19. The one or more non-transitory computer-readable media of claim 15, wherein the first haptic response further includes one of: a pattern or number of vibrations corresponding to the determined first feedback output.

20. The one or more non-transitory computer-readable media of claim 15, wherein analyzing the transaction data includes retrieving user data associated with a user of the payment card.

21. The one or more non-transitory computer-readable media of claim 15, further including instructions that, when executed, cause the computing platform to:
transmit, to a user computing device different from the payment card, the second feedback output command, wherein transmitting the second feedback output command causes the user computing device to execute the second haptic response including vibration of the user computing device.

* * * * *